(12) United States Patent
Muthyala et al.

(10) Patent No.: US 10,326,863 B2
(45) Date of Patent: Jun. 18, 2019

(54) SPEED AND ACCURACY OF COMPUTERS WHEN RESOLVING CLIENT QUERIES BY USING GRAPH DATABASE MODEL

(71) Applicant: ADP, LLC, Roseland, NJ (US)

(72) Inventors: Sunilkumar Muthyala, Hyderabad (IN); Amit Kumar Sharma, Hyderabad (IN)

(73) Assignee: ADP, LLC, Roseland, NJ (US)

( * ) Notice: Subject to any disclaimer, the term of this patent is extended or adjusted under 35 U.S.C. 154(b) by 169 days.

(21) Appl. No.: 15/411,963

(22) Filed: Jan. 21, 2017

(65) Prior Publication Data

US 2018/0213062 A1 Jul. 26, 2018

(51) Int. Cl.
*G06N 3/00* (2006.01)
*G06F 16/33* (2019.01)
*G06N 20/00* (2019.01)
*H04L 12/58* (2006.01)
*H04L 29/06* (2006.01)
*H04L 29/08* (2006.01)
*G06F 16/901* (2019.01)

(52) U.S. Cl.
CPC .......... *H04L 67/42* (2013.01); *G06F 16/3344* (2019.01); *G06F 16/9024* (2019.01); *G06N 3/006* (2013.01); *G06N 20/00* (2019.01); *H04L 51/02* (2013.01); *H04L 67/306* (2013.01)

(58) Field of Classification Search
CPC ......... G06F 17/30864; G06F 17/30011; G06F 17/30967; G06F 17/30979; G06F 17/2705; G06F 17/271; G06F 17/277; G06F 17/2785; G06F 17/30654; G06F 17/30634; G06F 17/30976; G06F 17/30684; G06F 17/30958; H04L 67/42; H04L 51/02; G06N 3/006; G06N 99/005
See application file for complete search history.

(56) References Cited

U.S. PATENT DOCUMENTS 7,505,892 B2 3/2009 Foderaro
7,809,548 B2 10/2010 Mihalcea et al.
(Continued)

OTHER PUBLICATIONS

Hongchi Shi, Using Natural Language to Access Databases on the Web, 2001, IEEE, Print ISBN: 0-7803-7087-2, 429-434 (Year: 2001).*

(Continued)

*Primary Examiner* — Ranodhi Serrao
(74) *Attorney, Agent, or Firm* — Yee & Associates, P.C.

(57) ABSTRACT

A computer-implemented method of improving a speed and an accuracy of a server computer executing a chat bot using a processor. An input is received at the chat bot at the server computer from a client computer over a network. The input is parsed using a natural language engine into one or more keywords. The one or more keywords are assigned to one or more part of speech tags. All of the input is stored as a profile into a non-transitory computer recordable storage medium. The graph database model is traversed, with traversing including comparing the profile to nodes in the graph database model and using relationships among the nodes as part of the comparing, and wherein traversing ends at a root node in the graph database model. A solution stored in the root node is returned to the client computer, by the processor and over the network.

12 Claims, 4 Drawing Sheets

(56) References Cited

U.S. PATENT DOCUMENTS

| | | |
|---|---|---|
| 8,560,477 B1 | 10/2013 | Petrov et al. |
| 8,818,926 B2 | 8/2014 | Wallace |
| 10,015,124 B2* | 7/2018 | McGregor, Jr. ......... H04L 51/10 |
| 2012/0136863 A1* | 5/2012 | Bobick ............. G06F 17/30731 |
| | | 707/737 |
| 2014/0250195 A1 | 9/2014 | Capper et al. |
| 2017/0048170 A1* | 2/2017 | Smullen ................ H04L 67/322 |
| 2017/0330106 A1* | 11/2017 | Lindsley .................. G06N 5/02 |

OTHER PUBLICATIONS

Victor S. Adamchik, Binary Trees, 2014, https://web.archive.org/web/20141206194442/https://www.cs.cmu.edu/~adamchik/15-121/lectures/Trees/trees.html (Year: 2014).*

Knight, "Google to Developers: Here's How to Stop Making Dumb Chatbots," https://www.technologyreview.com/s/601440/google-to-developers-heres-how-to-stop-making-dumb-chatbots/, May 12, 2016, 6 pages.

Ellis, "Creating a Chat Bot," https://medium.freecodecamp.com/creating-a-chat-bot-42861e6a2acd#.br95h7d7i, Oct. 14, 2014, 16 pages.

Amilon, "Chatbot with Common-sense database," KTH Royal Institute of Technology, CSC School, Degree Project, in Computer Science, First Level, Stockholm, Sweden, 2015, 23 pages.

* cited by examiner

SPEED AND ACCURACY OF COMPUTERS WHEN RESOLVING CLIENT QUERIES BY USING GRAPH DATABASE MODEL

BACKGROUND INFORMATION

1. Field

The present disclosure relates to methods and devices for improving the speed and accuracy of computers when resolving client queries to a chat bot by using a graph database model.

2. Background

A chat bot, also known as a chatterbot, a talkbot, chatbot, bot, chatterbox, an artificial conversational entity and possibly other names, is a computer program that conducts a conversation with a human user via auditory or textual methods. Chat bots may be used in dialog systems for customer service or information acquisition. Thus, for example, a chat bot could be used to respond to a customer query submitted via a chat box. Some chat bots use natural language processing systems, but many simpler chat bots scan for keywords within a chat input and then pull a reply with the most matching keywords, or the most similar wording pattern, from a database.

However, chat bots used for customer service often have problems. For example, the information returned by the chat bot may not be relevant to the user resulting in user frustration. In another example, the information may be returned by the chat bot undesirably slowly due to the processing or communication bandwidth needed to operate the chat bot. Therefore, a need exists to improve chat bots.

SUMMARY

The illustrative embodiments provide for a computer-implemented method of improving a speed and an accuracy of a server computer executing a chat bot using a processor. The method includes receiving at the chat bot at the server computer, from a client computer and over a network, an input. The method also includes parsing, by the processor, the input using a natural language engine into one or more keywords. The method also includes assigning, by the processor, the one or more keywords to one or more part of speech tags. The method also includes storing as a profile, by the processor, into a non-transitory computer recordable storage medium, all of the input, the one or more keywords, and the one or more part of speech tags. The method also includes traversing, by the processor, the graph database model, wherein traversing includes comparing the profile to nodes in the graph database model and using relationships among the nodes as part of the comparing, and wherein traversing ends at a root node in the graph database model. The method also includes returning to the client computer, by the processor and over the network, a solution stored in the root node.

The illustrative embodiments also contemplate a computer configured to execute program code which implements this method. The illustrative embodiments also contemplate a non-transitory computer recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
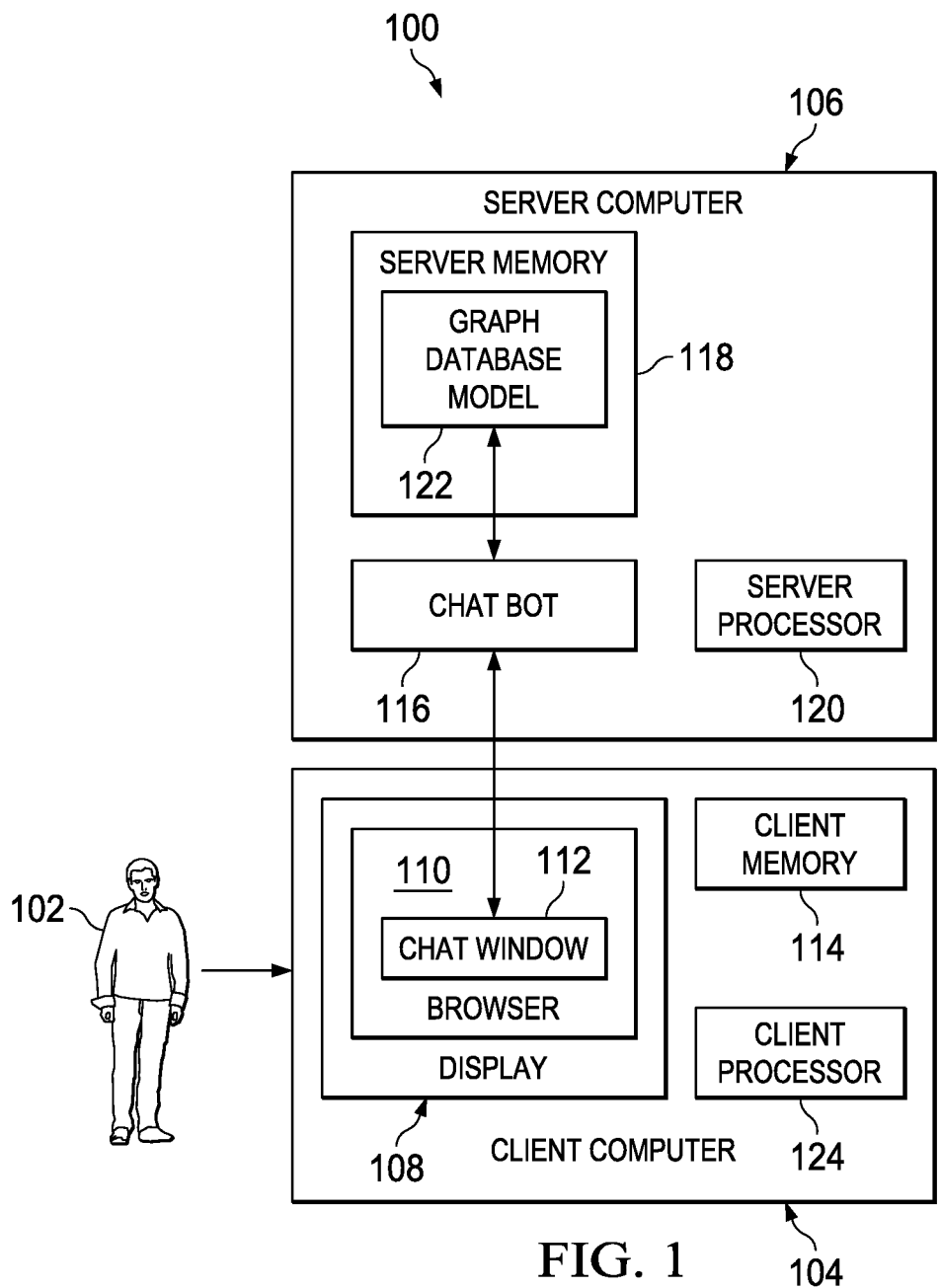
FIG. 1 is a block diagram of a network-centric environment, in accordance with an illustrative embodiment.

The illustrative embodiments recognize and take into account that the speed and accuracy of computers are desirably improved by increasing the speed and accuracy of chat bot responses. The illustrative embodiments also recognize and take into account that, by addressing a client query by using an inference model, the illustrative embodiments help in dynamically building and enriching a graph model of questions, which are all of similar kind. The illustrative embodiments then use the graph model along with natural language processing techniques to address a client query with a chatbot.

The illustrative embodiments also provide the capability of a chat bot to answer any query with the intent of the question. The server machine goes through all documents and prepares data to search the graph database model in an optimized manner, using a ranking system, and coming up with the most likely answer. The illustrative embodiments provide for the chat bot to learn from user feedback by constantly updating the graph database model according to the queries and responses received from the user.

The illustrative embodiments also recognize and take into account that the graph database model of the illustrative embodiments links people and entities by relationships. Nodes of the graph database model are joined through vertices and relationships defined by a node structure. Thus, the illustrative embodiments take questions and build or modify the graph database model using questions and other input from the user. The chat bot can then go through a graph of questions and figure out what the user wants to know. For example, the chat bot of the illustrative embodiments can respond to same question in different ways by looking at key words and checking the graph database model for which question best matches information in the graph database model. Accordingly, the illustrative embodiments provide for a chat bot which is not only more efficient at initial use, but also improves over time with use.

The illustrative embodiments also provide for using the root of the graph database model to figure out the solution to the user query. Specifically, the illustrative embodiments use a graph tree model to enrich a data set with different questions that the user is posing, and use the client computer program in front to stream an answer to the user without any manual or human intervention.

Additionally, all questions are stored from all users. Thus, all users' questions and comments help improve the system. One query can refer back into the graph database model to be used for the next query by a different person. The illustrative embodiments specifically provide for storing users' questions in the graph database as part of the node relationship of the graph database model. The illustrative embodiments also store grammatical constructs as nodes in the graph database model. The illustrative embodiments also build relationships as nodes in the graph database model.

Accordingly, the illustrative embodiments can provide data as to how questions are related. The illustrative embodiments can also categorize question trees, including different trees created over time. The illustrative embodiments store relationships between questions in peer to peer nodes and vertices in the graph database model. The illustrative embodiments can discover related questions or messages if a given question or message does not match what is in the system.

In this manner, the illustrative embodiments improve the speed and accuracy of the computer or computers processing user queries or messages at a chat bot. The speed of the computer or computers increases because the processor can operate more efficiently using the graph database model available to it. The accuracy of the computer or computers increases because the graph database model allows for answering a question according to context provided by multiple questions from multiple users and not just key words alone.

The illustrative embodiments also recognize and take into account that some chat bot technologies are currently available. However, the illustrative embodiments also recognize and take into account that no current chat bot uses a graph tree model to store questions. Graph tree models have been used to address problems related to document classification or clustering, sentence correction, and text summarization (generic summary of a text by selecting a subset of the sentences/paragraphs). However, no one has recognized the concept of using a graph tree model to build a graph tree over a period of time and enriching it based on the client queries and responses.

No prior chat bot technology provides for using natural language processing techniques to create unique nodes and build relationships between these nodes in a graph database model using the similarity of parts of speech tagging between the nodes. No prior chat bot technology provides for using the above techniques to build a graph tree for every root node over a period of time using self-learning. Again, a root node represents a unique question or solution. No prior chat bot technology provides for using all available parts of speech tags within that graph tree to perform spell correction with respect to input received from a user. No prior chat bot technology provides for using user feedback to create, for each of the nodes, ratings which will come into play when there is a contention among more than one node to qualify as a most possible match.

These advantages also increase the speed and accuracy of the computer or computers processing a chat bot. Thus, the illustrative embodiments not only represent a significant improvement in chat bot technology, but also represent a significant improvement in computer speed and accuracy.

FIG. 1 is a block diagram of a network-centric environment, in accordance with an illustrative embodiment. Specifically, FIG. 1 shows use of a chat bot in order to show the context of the illustrative embodiments. Network-centric environment 100 includes user 102 using client computer 104 in communication with server computer 106. Either client computer 104 or server computer 106 may be data processing system 500 of FIG. 5, or any other data processing system including mobile computers, phones, pads, or other electronic devices.

What user 102 sees on display 108 of client computer 104 is browser 110. Browser 110 displays chat window 112, according to instructions of software on client memory 114 as executed by client processor 124. User 102 uses an input device, such as but not limited to a keypad or a touchpad, to enter a question or message into chat window 112. That question or message is transmitted to chat bot 116 via a network such as the Internet via a communications system, which may be wireless or wired.

Chat bot 116 is operated by server computer 106 according to instructions of software on server memory 118 as executed by server processor 120. Chat bot 116 receives a question or message entered into chat window 112 by user 102. Chat bot 116 then uses graph database model 122 to respond to the question or message from received from chat window 112.

Figure 2:
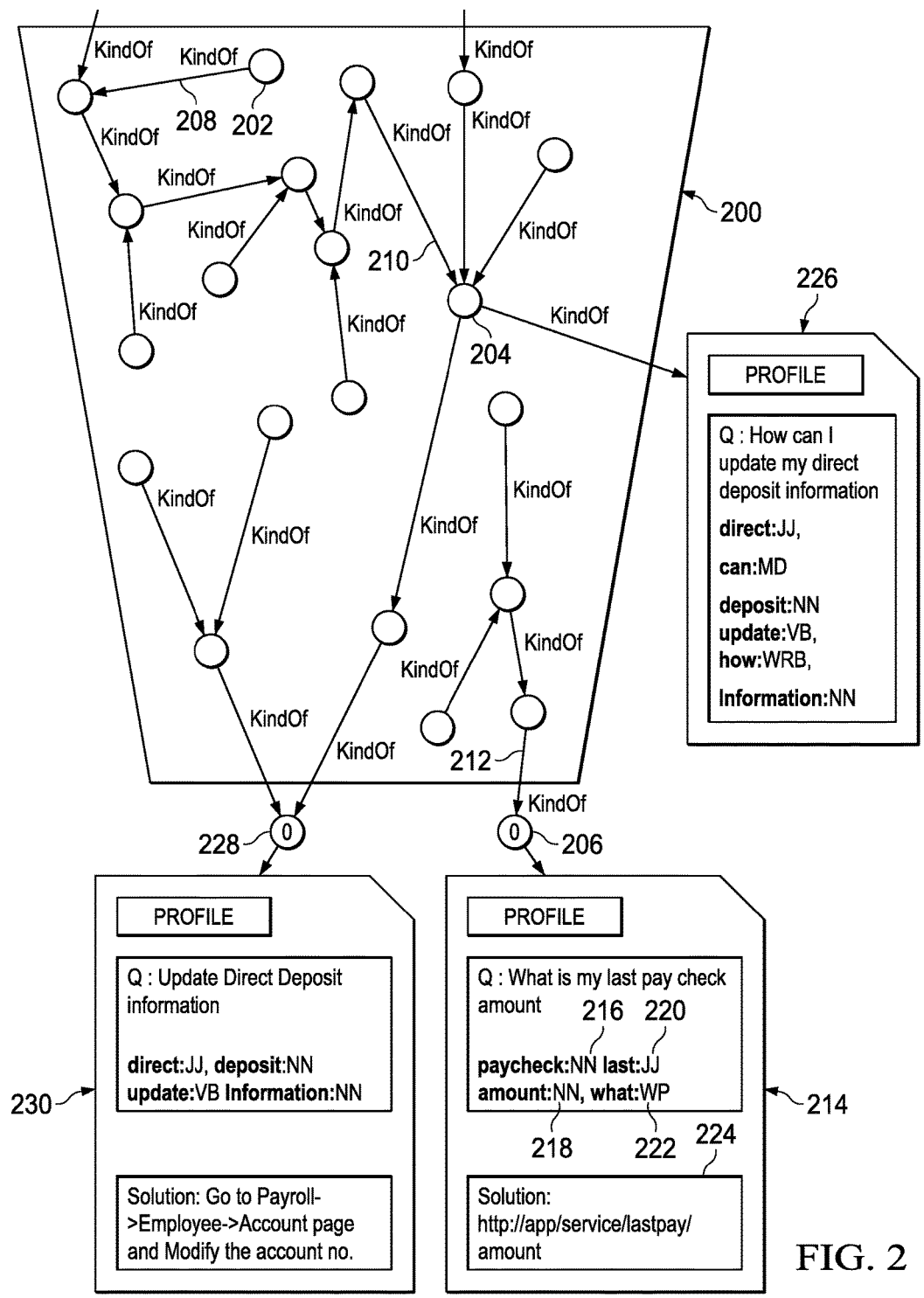
FIG. 2 is an illustration of a graph database model, in accordance with an illustrative embodiment.

The illustrative embodiments are directed toward the operation of chat bot 116, and in particular are directed toward the use of graph database model 122. FIG. 2, below, describes graph database model 122, and FIG. 3 and FIG. 4 describe particular uses or designs of graph database model 122 and its use.

FIG. 2 is an illustration of a graph database model, in accordance with an illustrative embodiment. Graph database model 200 is an example of graph database model 122 of FIG. 1, and may have the properties as described both above and below. In particular, the illustrative embodiments contemplate a chat bot using graph database model 200 to respond to queries or messages received from a user, as described with respect to FIG. 1.

Graph database model 200 includes nodes, such as node 202, node 204, or node 206. Many other nodes are shown in graph database model 200 without being specifically named. Graph database model 200 stores relationships among the nodes, as represented by the lines between nodes, such as but not limited to line 208, line 210, or line 212. Each node may be a particular piece of data. A node may be, for example, a query or message received from a user. A node may be a profile of various information regarding a query or message received from a user. A node may contain information of interest to a user, such as for example payroll data or answers to common questions. The illustrative embodiments contemplate dynamically adding nodes to graph database model 200 over time as additional queries and responses are created during operation of the chat bot which relies on graph database model 200.

When it comes to client query resolution using a chatbot, having a good understanding of the intent behind the query is useful for giving the appropriate responses. In one illustrative embodiment, the intent of the user can be determined in two possible ways.

The first way is to put a trained natural language processing model to map the client query to one of the possible queries in the existing query database for which a solution exists, and then provide the pre-determined response. The second way is to list all possible permutations and combinations for a known query, and then use that set to map against the client query and provide a standard response.

This second approach can be driven by using a graph data model where all possible queries are represented as independent nodes. The independent nodes have keywords that form the query listed as the properties for that particular node. The keywords can be part of speech tags extracted from the user query or message. The nomenclature of part of speech tags is known, but not the use to which the illustrative embodiments put them. The relationships between each of these nodes represent the similarity between the queries. From any particular node in this tree, the processor can traverse back to the root node using the relationships to arrive at the known standard template query. The root node contains the answer or solution, or a reference to the answer or solution, which is then reported back to the user via the chat window.

Graph database model 200 can start with a root node, which represents the standard template query. When there is a new client query, the valid keywords in the query are matched against the properties of all of the nodes in that particular category and the node with most number of keyword matches can be selected as having a similar relationship with this query. Again, using the matched node, the processor can traverse back to the root node and stream the standard template question or response to the client. Based on the client feedback, a decision can be made to add the client query into the tree graph, thereby enriching graph database model 200 with all possible queries that are similar. Using this approach over a period of time, the processor can build an inference model that represents all possible ways a question can be phrased by users.

In FIG. 2, nodes marked with a '0', such as node 206, are root nodes seeded as part of initial deployment of the solution. Each node, including root nodes such as node 206, has a profile which stores data associated with the node, such as profile 214. Profile 214, in a specific example, is a "payroll" profile storing a question relating to payroll issues, in this case "what is my last paycheck amount". Each of the root nodes may have a unique set of part of tags as its properties, such as part of speech tag 216, part of speech tag 218, part of speech tag 220, and part of speech tag 222. These part of speech tags represent key words and their part of speech type in the above question.

Root nodes, including node 206, not only have a root question, they also have a solution for that question, such as solution 224. The solution may be a link to an answer to the question, that is the solution may be a link to the underlying data. The solution may be the answer to the question itself, that is the solution may be the underlying data. The solution may also refer to another question to be presented to the user to provide information necessary or desirable to more fully answer the user's question. The solution can take many different forms.

All other nodes are created and related to one or more corresponding root nodes based on the match of part of speech tags. Each of these created nodes may have the user question, which is likely rephrased in a different way with the intent remaining the same as the root question. For example, node 204 has profile 226, which stores information regarding how a user might ask about updating direct deposit information. This data relates to root node 228 having profile 230. In an illustrative embodiment, node 204 was created after initial preparation of graph database model 200 by the submission of a client query. Thus, node 204 may be considered a dynamically created node. Nodes are thereby dynamically created over time. Over that period of time, root nodes may be transformed into graph trees and there is very good probability of a client question matching any of the questions within this tree.

Figure 3:
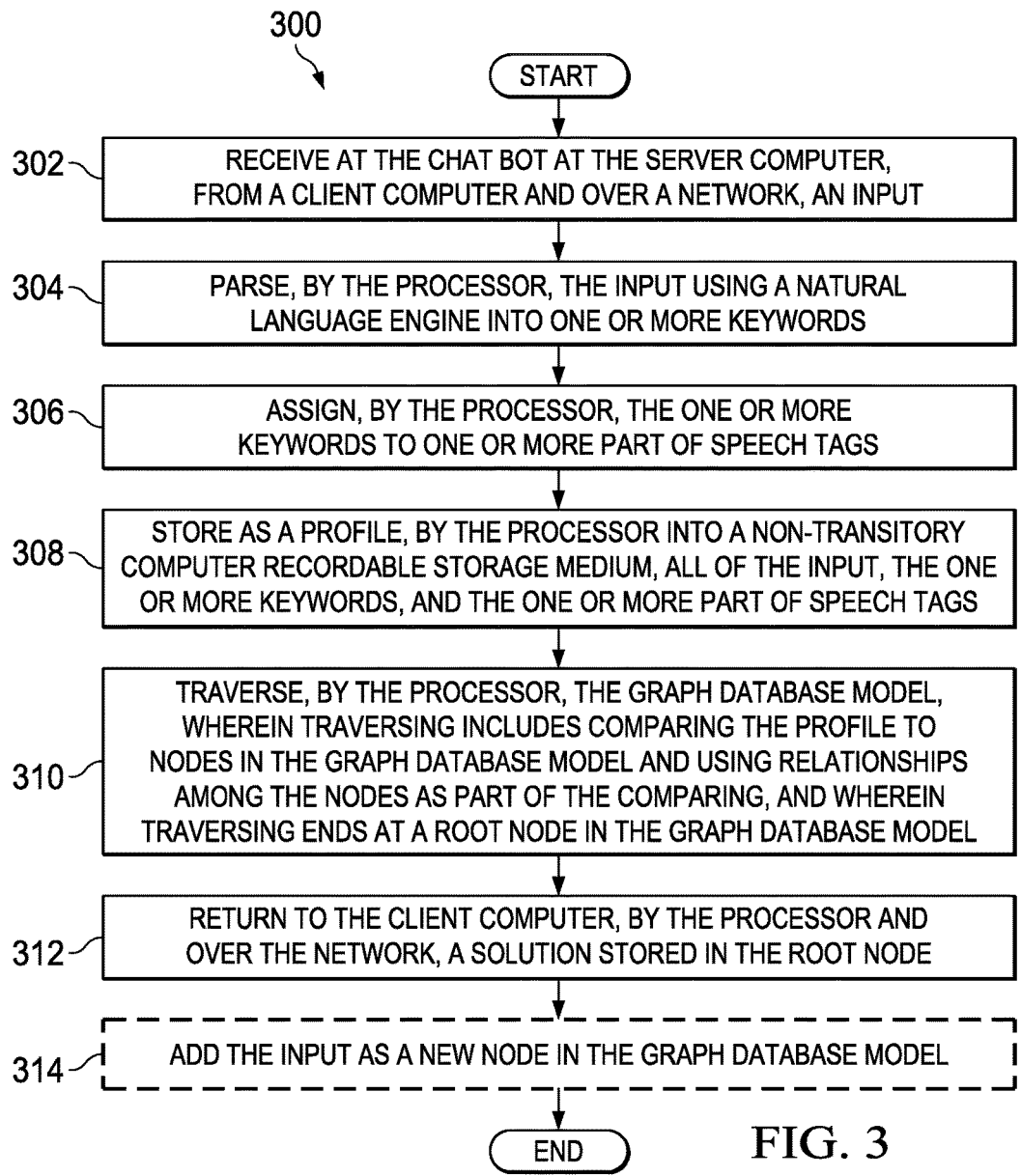
FIG. 3 is a flowchart of a method of improving a speed and an accuracy of a server computer executing a chat bot using a processor, in accordance with an illustrative embodiment.

FIG. 3 is a flowchart of a method of improving a speed and an accuracy of a server computer executing a chat bot using a processor, in accordance with an illustrative embodiment. Method 300 may be executed by a processor, such as processor unit 504 of FIG. 5 or server processor 120 of FIG. 1. Method 300 is an example of a method implementing the techniques described with respect to FIG. 2.

Method 300 includes receiving at the chat bot at the server computer, from a client computer and over a network, an input (operation 302). Method 300 also includes parsing, by the processor, the input using a natural language engine into one or more keywords (operation 304). Method 300 also includes assigning, by the processor, the one or more keywords to one or more part of speech tags (operation 306). Method 300 also includes storing as a profile, by the processor, into a non-transitory computer recordable storage medium, all of the input, the one or more keywords, and the one or more part of speech tags (operation 308).

Method 300 also includes traversing, by the processor, the graph database model, wherein traversing includes comparing the profile to nodes in the graph database model and using relationships among the nodes as part of the comparing, and wherein traversing ends at a root node in the graph database model (operation 310). Method 300 also includes returning to the client computer, by the processor and over the network, a solution stored in the root node (operation 312). Optionally, method 300 may terminate at this point.

However, optionally, method 300 may also include adding the input as a new node in the graph database model (operation 314). Operation 314 is shown as a box with a dashed line to indicate that it is optional. In one illustrative embodiment, the method may terminate thereafter.

Method 300 may be further varied. In an illustrative embodiment, adding the input further includes adding the profile as the new node. In this case, adding the input may further include establishing relationships among the new node and at least one existing node in the graph database model.

Method 300 may have additional operations. For example, in an illustrative embodiment method 300 may also include: receiving a second input from a second client computer different than the client computer; parsing, by the processor, the second input using a natural language engine into other keywords; assigning, by the processor, the other keywords to other part of speech tags; storing as a second profile, by the processor into the non-transitory computer recordable storage medium, all of the second input, the other keywords, and the other part of speech tags; traversing, by the processor, the graph database model, wherein traversing includes comparing the second profile to nodes in the graph database model and using relationships among the nodes as part of the comparing, including comparing the second profile to the profile, and wherein traversing ends at a second root node in the graph database model; and returning to the client computer, by the processor and over the network, a second solution stored in the second root node. This set of operations is an example of using new nodes dynamically added to a graph database model when processing new input.

Method 300 may be yet further varied. For example, in an illustrative embodiment, the input may be one of a query and a message other than a query. In another illustrative embodiment, the solution may be at least one of a link to data which responds to the input according to an intent of a user providing the input, and data which responds to the input according to an intent of a user providing the input.

Method 300 may be still further varied. Method 300 may include more or fewer operations. The operations shown in method 300 may be varied as well. Thus, method 300 does not necessarily limit the claimed inventions.

Figure 4:
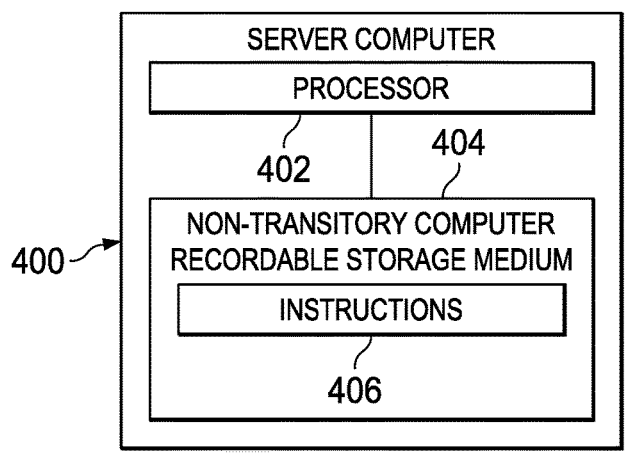
FIG. 4 is a block diagram of a server computer having improved a speed and an accuracy for executing a chat bot using a processor, in accordance with an illustrative embodiment.

FIG. 4 is a block diagram of a server computer having improved a speed and an accuracy for executing a chat bot using a processor, in accordance with an illustrative embodiment. Server computer 400 includes processor 402 in communication with non-transitory computer recordable storage medium 404. Non-transitory computer recordable storage medium 404 is a physical storage medium. Non-transitory computer recordable storage medium 404 stores instructions 406. Instructions 406 may be program code for carrying out a computer-implemented method, such as method 300 of FIG. 3.

Figure 5:
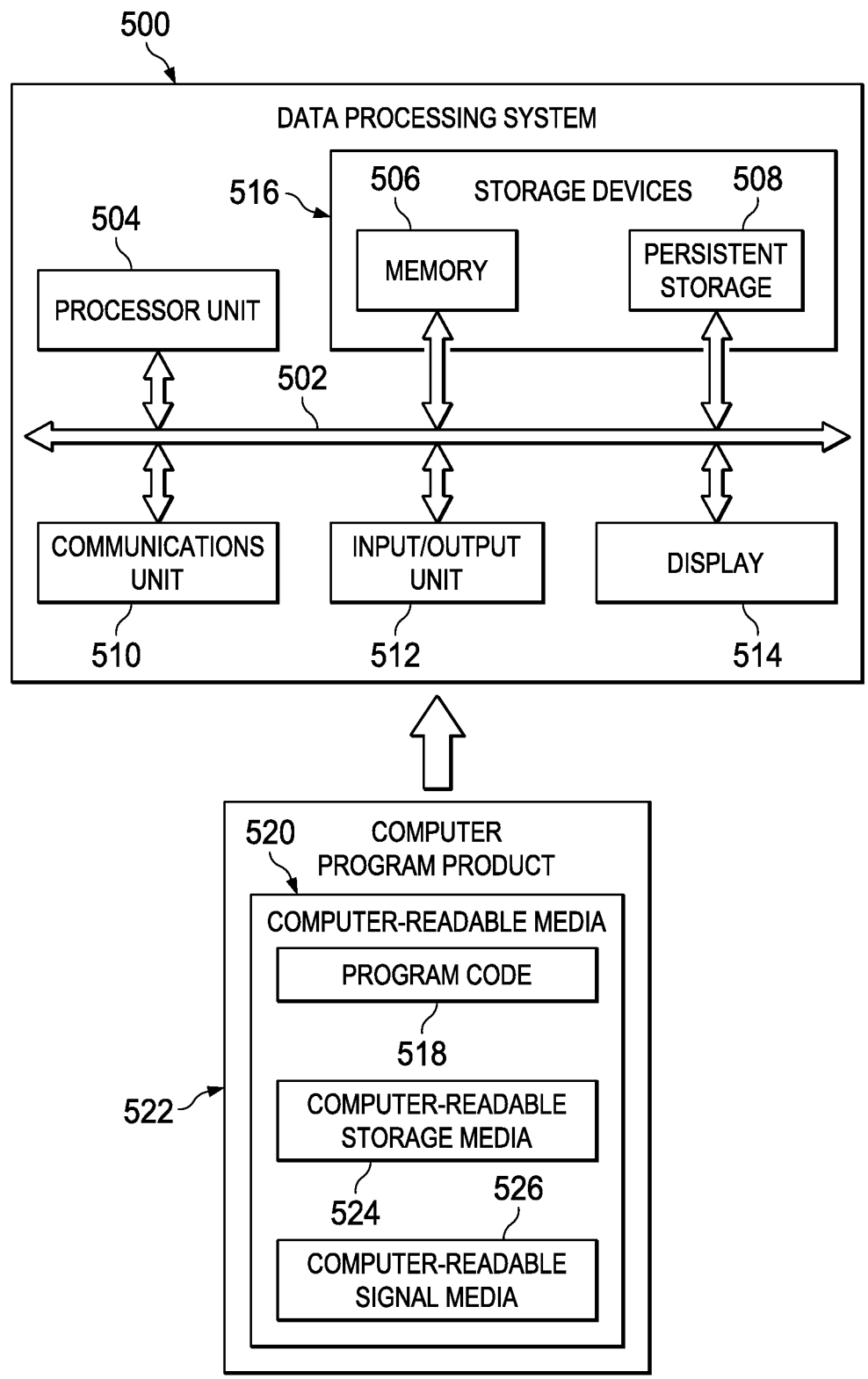
FIG. 5 is a block diagram of a data processing system, in accordance with an illustrative embodiment.

FIG. 5 is a block diagram of a data processing system depicted in accordance with an illustrative embodiment. Data processing system 500 is an example of a computer as described with respect to FIG. 1 through FIG. 4.

In this illustrative example, data processing system 500 includes communications framework 502, which provides communications between processor unit 504, memory 506, persistent storage 508, communications unit 510, input/output unit 512, and display 514. In this example, communication framework may take the form of a bus system.

Processor unit 504 serves to execute instructions for software that may be loaded into memory 506. Processor unit 504 may be a number of processors, a multi-processor core, or some other type of processor, depending on the particular implementation.

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software on client memory 114 or server memory 118 of FIG. 1, the program code on non-transitory computer recordable storage medium 404 of FIG. 4, or code for carrying out method 300 of FIG. 3. Storage devices 516 may also be referred to as computer-readable storage devices in these illustrative examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In one example, computer-readable media 520 may be computer-readable storage media 524 or computer-readable signal media 526.

In these illustrative examples, computer-readable storage media 524 is a physical or tangible storage device used to store program code 518 rather than a medium that propagates or transmits program code 518.

Alternatively, program code 518 may be transferred to data processing system 500 using computer-readable signal media 526. Computer-readable signal media 526 may be, for example, a propagated data signal containing program code 518. For example, computer-readable signal media 526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components, in addition to or in place of those illustrated for data processing system 500. Other components shown in FIG. 5 can be varied from the illustrative examples shown. The different embodiments may be implemented using any hardware device or system capable of running program code 518.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

As used herein, the term "server computer" is any computer which operates in the role of a server, whether or not the computer is configured specifically to operate as a "server." As used herein, the term "client computer" is any computer which operates in the roll of a client, whether or not the computer is configured specifically to operate as a "client" or a "workstation."

What is claimed is:

1. A computer-implemented method of improving a speed and an accuracy of a server computer executing a chat bot using a processor, the method comprising:
   receiving at the chat bot at the server computer, from a client computer and over a network, an input;
   parsing, by the processor, the input using a natural language engine into one or more keywords;
   assigning, by the processor, the one or more keywords to one or more part of speech tags;
   adding, by the processor into a non-transitory computer recordable storage medium, a new node to a graph database model, wherein adding the new node includes:
      storing all of the input, the one or more keywords, and the one or more part of speech tags as a profile of the new node; and
      establishing relationships among the new node and at least one existing node in the graph database model;
   traversing, by the processor, the graph database model, wherein traversing includes comparing the profile to nodes in the graph database model and using relationships among the nodes as part of the comparing, and wherein traversing ends at a root node in the graph database model; and
   returning to the client computer, by the processor and over the network, a solution stored in the root node.

2. The computer-implemented method of claim 1, further comprising:
   receiving a second input from a second client computer different than the client computer;
   parsing, by the processor, the second input using a natural language engine into other keywords;
   assigning, by the processor, the other keywords to other part of speech tags;
   adding, by the processor into the non-transitory computer recordable storage medium, a second new node to a graph database model, including storing all of the second input, the other keywords, and the other part of speech tags as a profile of the second new node;
   traversing, by the processor, the graph database model, wherein traversing includes comparing the second profile to nodes in the graph database model and using relationships among the nodes as part of the comparing, including comparing the second profile to the profile, and wherein traversing ends at a second root node in the graph database model; and
   returning to the client computer, by the processor and over the network, a second solution stored in the second root node.

3. The computer-implemented method of claim 1, wherein the input comprises one of a query and a message other than a query.

4. The computer-implemented method of claim 1, wherein the solution comprises at least one of a link to data which responds to the input according to an intent of a user providing the input, and data which responds to the input according to an intent of a user providing the input.

5. A computer comprising:
   a processor;
   a memory comprising a physical memory, in communication with the processor, the memory storing program code which, when executed by the processor, performs a computer-implemented method of improving a speed and an accuracy of a server computer executing a chat bot using a processor, the program code comprising:
   program code for receiving at the chat bot at the server computer, from a client computer and over a network, an input;
   program code for parsing, by the processor, the input using a natural language engine into one or more keywords;
   program code for assigning, by the processor, the one or more keywords to one or more part of speech tags;
   program code for adding, by the processor, a new node to a graph database model, wherein the program code for adding the new node includes:
      program code for storing all of the input, the one or more keywords, and the one or more part of speech tags as a profile of the new node; and
      program code for establishing relationships among the new node and at least one existing node in the graph database model;
   program code for traversing, by the processor, the graph database model, wherein traversing includes comparing the profile to nodes in the graph database model and using relationships among the nodes as part of the comparing, and wherein traversing ends at a root node in the graph database model; and
   program code for returning to the client computer, by the processor and over the network, a solution stored in the root node.

6. The computer of claim 5, wherein the program code further comprises:
   program code for receiving a second input from a second client computer different than the client computer;
   program code for parsing, by the processor, the second input using a natural language engine into other keywords;
   program code for assigning, by the processor, the other keywords to other part of speech tags;
   program code for adding, by the processor, a second new node to a graph database model, including storing all of the second input, the other keywords, and the other part of speech tags as a profile of the second new node;
   program code for traversing, by the processor, a graph database model, wherein traversing includes comparing the second profile to nodes in the graph database model and using relationships among the nodes as part of the comparing, including comparing the second profile to the profile, and wherein traversing ends at a second root node in the graph database model; and
   program code for returning to the client computer, by the processor and over the network, a second solution stored in the second root node.

7. The computer of claim 5, wherein the input comprises one of a query and a message other than a query.

8. The computer of claim 5, wherein the solution comprises at least one of a link to data which responds to the input according to an intent of a user providing the input, and data which responds to the input according to an intent of a user providing the input.

9. A non-transitory computer recordable storage medium storing program code which, when executed by a processor, performs a computer-implemented method of improving a speed and an accuracy of a server computer executing a chat bot using a processor, the program code comprising:
    program code for receiving at the chat bot at the server computer, from a client computer and over a network, an input;
    program code for parsing, by the processor, the input using a natural language engine into one or more keywords;
    program code for assigning, by the processor, the one or more keywords to one or more part of speech tags;
    program code for adding, by the processor, a new node to a graph database model, wherein the program code for adding the new node includes:
        program code for storing all of the input, the one or more keywords, and the one or more part of speech tags as a profile of the new node; and
        program code for establishing relationships among the new node and at least one existing node in the graph database model;
    program code for traversing, by the processor, the graph database model, wherein traversing includes comparing the profile to nodes in the graph database model and using relationships among the nodes as part of the comparing, and wherein traversing ends at a root node in the graph database model; and
    program code for returning to the client computer, by the processor and over the network, a solution stored in the root node.

10. The non-transitory computer recordable storage medium of claim 9, wherein the program code further comprises:
    program code for receiving a second input from a second client computer different than the client computer;
    program code for parsing, by the processor, the second input using a natural language engine into other keywords;
    program code for assigning, by the processor, the other keywords to other part of speech tags;
    program code for adding, by the processor, a second new node to a graph database model, including storing all of the second input, the other keywords, and the other part of speech tags as a profile of the second new node;
    program code for traversing, by the processor, a graph database model, wherein traversing includes comparing the second profile to nodes in the graph database model and using relationships among the nodes as part of the comparing, including comparing the second profile to the profile, and wherein traversing ends at a second root node in the graph database model; and
    program code for returning to the client computer, by the processor and over the network, a second solution stored in the second root node.

11. The non-transitory computer recordable storage medium of claim 9, wherein the solution comprises at least one of a link to data which responds to the input according to an intent of a user providing the input, and data which responds to the input according to an intent of a user providing the input.

12. The non-transitory computer recordable storage medium of claim 9, wherein the input comprises one of a query and a message other than a query.

\* \* \* \* \*